United States Patent
Nakatani

(10) Patent No.: US 12,078,743 B2
(45) Date of Patent: Sep. 3, 2024

(54) RADAR SIGNAL PROCESSING DEVICE, RADAR DEVICE, RADAR SIGNAL PROCESSING METHOD AND NON-TRANSITORY COMPUTER-READABLE MEDIUM

(71) Applicant: FURUNO ELECTRIC CO., LTD., Hyogo (JP)

(72) Inventor: Fumiya Nakatani, Toyonaka (JP)

(73) Assignee: FURUNO ELECTRIC CO., LTD., Hyogo (JP)

( * ) Notice: Subject to any disclaimer, the term of this patent is extended or adjusted under 35 U.S.C. 154(b) by 384 days.

(21) Appl. No.: 17/571,563

(22) Filed: Jan. 10, 2022

(65) Prior Publication Data

US 2022/0252692 A1    Aug. 11, 2022

(30) Foreign Application Priority Data

Feb. 5, 2021   (JP) ................. 2021-017192

(51) Int. Cl.
*G01S 7/02* (2006.01)
*G01S 7/35* (2006.01)
*G01S 13/34* (2006.01)

(52) U.S. Cl.
CPC ............ *G01S 7/0235* (2021.05); *G01S 7/356* (2021.05); *G01S 13/341* (2013.01)

(58) Field of Classification Search
None
See application file for complete search history.

(56) References Cited

U.S. PATENT DOCUMENTS

| | | | |
|---|---|---|---|
| 9,348,016 B2* | 5/2016 | Asanuma | G01S 13/723 |
| 9,952,312 B2 | 4/2018 | Corbett | |
| 2014/0145871 A1 | 5/2014 | Asanuma | |
| 2015/0066389 A1* | 3/2015 | Datchanamoorthy | F01D 21/003 702/35 |
| 2017/0153315 A1 | 6/2017 | Katayama | |
| 2020/0393536 A1 | 12/2020 | Stettiner | |
| 2021/0128068 A1* | 5/2021 | Ghoshal | A61B 5/02444 |

FOREIGN PATENT DOCUMENTS

| | | | |
|---|---|---|---|
| DE | 102013221766 | 5/2014 | |
| JP | 2018021784 | 2/2018 | |
| JP | 2021067461 A * | 4/2021 | G01S 7/40 |

OTHER PUBLICATIONS

"Search Report of Europe Counterpart Application", issued on Jun. 23, 2022, pp. 1-7.

* cited by examiner

*Primary Examiner* — Vladimir Magloire
*Assistant Examiner* — Eric K Hodac
(74) *Attorney, Agent, or Firm* — JCIPRNET

(57) ABSTRACT

A radar signal processing device includes: a processing circuitry configured to generate a processing signal based on a beat signal obtained from a transmitted signal and a received signal, generate a smoothed signal by filtering the processing signal using a smoothing filter in a time domain; and detect an interference signal included in the beat signal based on the processing signal and the smoothed signal.

17 Claims, 19 Drawing Sheets

RADAR SIGNAL PROCESSING DEVICE, RADAR DEVICE, RADAR SIGNAL PROCESSING METHOD AND NON-TRANSITORY COMPUTER-READABLE MEDIUM

CROSS-REFERENCE TO RELATED APPLICATION

This application claims the priority benefit of Japan application serial No. 2021-017192, filed on Feb. 5, 2021. The entirety of the above-mentioned patent application is hereby incorporated by reference herein and made a part of this specification.

BACKGROUND

Technical Field

The disclosure relates to a radar signal processing device, a radar device, a radar signal processing method, and a radar signal processing program.

Conventional Art

There has conventionally been known a technique of removing interference waves mixed in a radar reception signal.

There is a desire for such a technique that surpasses the above-mentioned technique and that is capable of relatively accurately detecting a target based on a beat signal.

SUMMARY

The purpose of the disclosure relates to a radar signal processing device, a radar device, a radar signal processing method, and a radar signal processing program capable of relatively accurately detecting a target based on a beat signal.

A radar signal processing device according to an aspect of the disclosure includes: a processing circuitry configured to generate a processing signal based on a beat signal obtained from a transmitted signal and a received signal, generate a smoothed signal by filtering the processing signal using a smoothing filter in a time domain; and detect an interference signal included in the beat signal based on the processing signal and the smoothed signal.

In this way, by the configuration to detect the interference signal based on the smoothed signal generated by filtering the processing signal using the smoothing filter in the time domain and the processing signal, the interference signal including interference waves of various frequencies can be detected by simple processing. In addition, since the beat signal has relatively large signal level fluctuation in an azimuth direction, in the case of applying interference removal processing in the azimuth direction generally used in a conventional pulse radar to the beat signal, erroneous determination of the interference signal may occur. In contrast, by the above configuration, erroneous determination due to signal level fluctuation of the beat signal in the azimuth direction can be suppressed and the interference signal can be relatively accurately detected. Thus, a decrease in a signal-noise (SN) ratio of a power spectrum generated based on the beat signal, for example, can be suppressed. Therefore, the target can be relatively accurately detected based on the beat signal.

According to the disclosure, a target can be relatively accurately detected based on a beat signal.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein:

DESCRIPTION OF THE EMBODIMENTS

Figure 1:
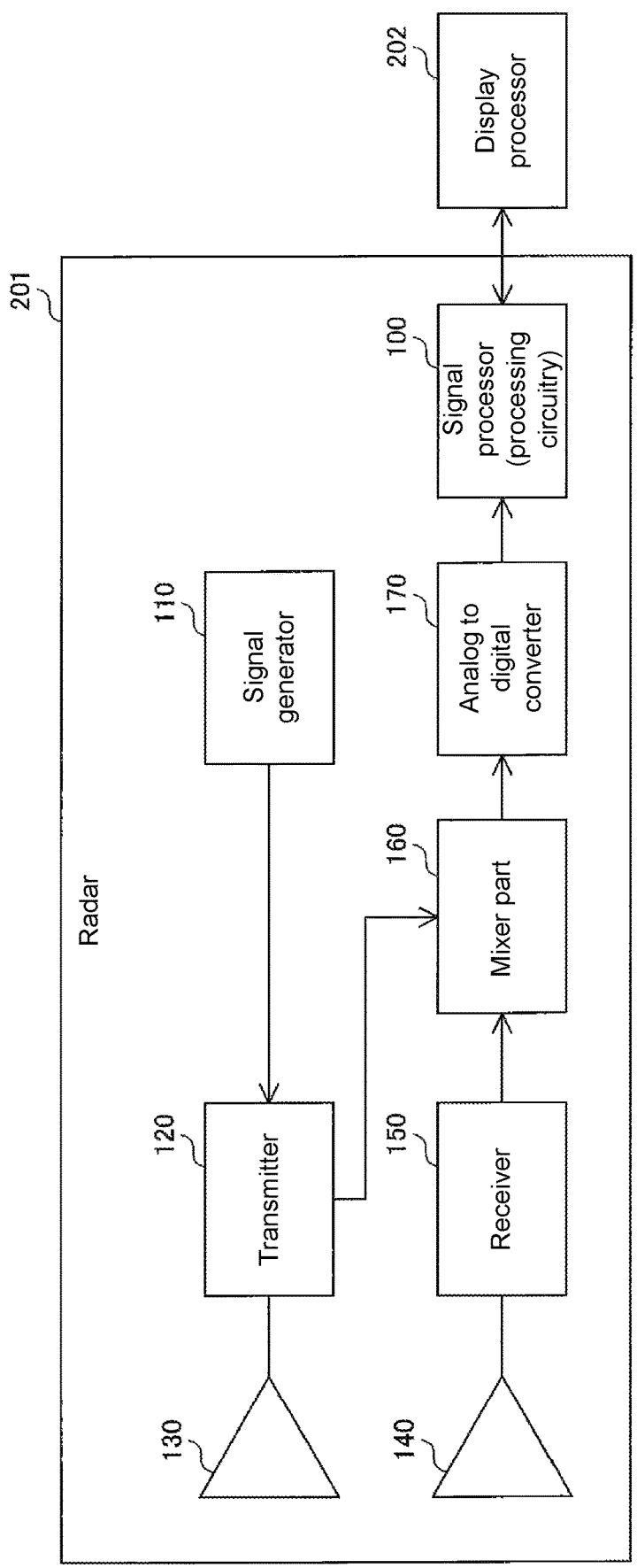
FIG. 1 illustrates a configuration of a radar device according to an embodiment of the disclosure.

Hereinafter, embodiments of the disclosure are described with reference to the drawings. The same or equivalent portions in the drawings are assigned with the same reference numerals and description thereof will not be repeated. In addition, at least some of the embodiments described below may be arbitrarily combined.

[Configuration and Basic Operation]

<Radar Device>

FIG. 1 illustrates a configuration of a radar device according to an embodiment of the disclosure.

Referring to FIG. 1, a radar device 300 includes a radar 201 and a display processor 202. The radar 201 includes a signal generator 110, a transmitter 120, a transmitting antenna 130, a receiving antenna 140, a receiver 150, a mixer part 160, an analog to digital (A/D) converter 170, and a signal processor 100 (which is also referred to as a processing circuitry). The signal processor 100 is an example of a radar signal processing device. For example, the radar device 300 is a frequency modulated continuous wave (FM-CW) radar device and is mounted on a ship. The radar device 300 may perform processing configured to display, on a display device (not shown), an echo image indicating the presence or absence of a target in a detection target area being a domain monitored by the ship as well as a distance between the radar device 300 and the target.

The radar 201 may output, to the display processor 202, echo data indicating a detection result of the target in a divided target area being a domain obtained by dividing the detection target area into multiple domains. The transmitting antenna 130 and the receiving antenna 140 may rotate so that an azimuth angle in a radio wave radiation direction of the transmitting antenna 130 changes by a particular angle every particular sweep period T. The radar 201 may output, to the display processor 202, the echo data in multiple divided target areas for each sweep period T.

The display processor 202 may perform processing configured to display the echo image in the detection target area on the display device based on multiple echo data received from the radar 201.

<Radar>

The signal generator 110 may repeatedly generate an analog signal of a particular pattern and output the same to the transmitter 120. More specifically, in the sweep period T, the signal generator 110 may output, to the transmitter 120, an analog signal generated by a modulation method such as an FM-CW method and having a frequency increasing by a particular amount per unit time. Specifically, for example, the signal generator 110 includes a voltage generator and a voltage-controlled oscillator (VCO). In the sweep period T, the voltage generator may generate an FM modulated voltage having a magnitude increasing at a constant rate and output the same to the VCO. The VCO may generate an analog signal having a frequency corresponding to the magnitude of the FM modulated voltage received from the voltage generator and output the same to the transmitter 120.

The transmitter 120 may transmit a transmitted signal. More specifically, in the sweep period T, the transmitter 120 may generate a transmitted signal of a radio frequency (RF) band based on the analog signal received from the signal generator 110, and output the generated transmitted signal of the RF band to the divided target area via the transmitting antenna 130 that rotates with rotation of the radar 201. The transmitter 120 may output the generated transmitted signal of the RF band to the mixer part 160. Specifically, for example, the transmitter 120 includes a mixer and a power amplifier. This mixer may generate the transmitted signal of the RF band based on the analog signal received from the signal generator 110, and output the generated transmitted signal to the power amplifier and the mixer part 160. In the transmitter 120, the power amplifier may amplify the transmitted signal received from the mixer, and output the amplified transmitted signal to the divided target area via the transmitting antenna 130.

The receiver 150 may receive a reflected signal obtained by reflecting the transmitted signal by the target. More specifically, the receiver 150 may receive a reflected signal of the RF band via the receiving antenna 140 that rotates with rotation of the radar 201. The reflected signal of the RF band is obtained by reflecting the transmitted signal transmitted from the transmitting antenna 130 by the target in the divided target area. The receiver 150 may also receive, via the receiving antenna 140, an interference wave transmitted by an interfering object. The interfering object is, for example, a pulse radar device located in the divided target area or outside the divided target area. The receiver 150 may output a signal received via the receiving antenna 140 to the mixer part 160. Specifically, for example, the receiver 150 includes a low noise amplifier. The low noise amplifier may amplify a received signal of the RF band received via the receiving antenna 140, and output the amplified received signal to the mixer part 160.

The mixer part 160 may generate a beat signal of the transmitted signal transmitted from the radar device 300 and the received signal received by the radar device 300. Here, the beat signal is a signal having a frequency component of a difference between a frequency component of the transmitted signal transmitted by the transmitter 120 and a frequency component of the received signal received by the receiver 150. More specifically, the mixer part 160 includes, for example, two mixers. A branch part (not shown) may branch the transmitted signal output from the transmitter 120 and apply a phase difference of 90° to the transmitted signals obtained by branching, and output the same to each mixer in the mixer part 160. The branch part (not shown) may branch the received signal output from the receiver 150 and output the same to each mixer in the mixer part 160. The two mixers in the mixer part 160 may respectively multiply the transmitted signals and received signals, thereby generating an analog beat signal SA composed of a pair of an I signal Si and a Q signal Sq and outputting the same to the A/D converter 170.

The A/D converter 170 may convert the analog beat signal SA received from the mixer part 160 to a beat signal SD being a digital signal composed of a pair of the I signal Si and the Q signal Sq. More specifically, the A/D converter 170 may perform sampling at a particular sampling frequency every sweep period T, thereby generating N beat signals SD composed of pairs of N I signals Si and N Q signals Sq and outputting the same to the signal processor 100. N is an integer equal to or greater than 2, and is, for example, 1024.

The signal processor 100 may process the N beat signals SD received from the A/D converter 170 in each sweep period T, thereby generating the echo data indicating the detection result of the target in the divided target area for each sweep period T. The signal processor 100 may output the generated echo data to the display processor 202. Hereinafter, the beat signal SD received by the signal processor 100 from the A/D converter 170 in the sweep signal T and having a sample number n is also referred to as a beat signal SD(n). n is an integer equal to or greater than 1 and equal to or less than N, and corresponds to an elapsed time from the start of the sweep period T. The beat signal SD(n) is a signal composed of a pair of an I signal Si(n) having the sample number n and a Q signal Sq(n) having the sample number n.

The radar device 300 may be configured to include, instead of the transmitting antenna 130 and the receiving antenna 140, one antenna that functions as the transmitting antenna 130 and the receiving antenna 140. In this case, for example, the transmitter 120 may transmit the transmitted signal to the transmitting antenna 130 via a circulator. For example, the receiver 150 may receive the received signal from the receiving antenna 140 via the circulator.

<Display Processor>

The display processor 202 may, based on the echo data for each divided target area that is received from the signal processor 100, generate integrated data being the echo data in the detection target area, and may, based on the generated integrated data, perform the processing configured to display the echo image in the detection target area on the display device (not shown).

<Signal Processor>

Figure 2:
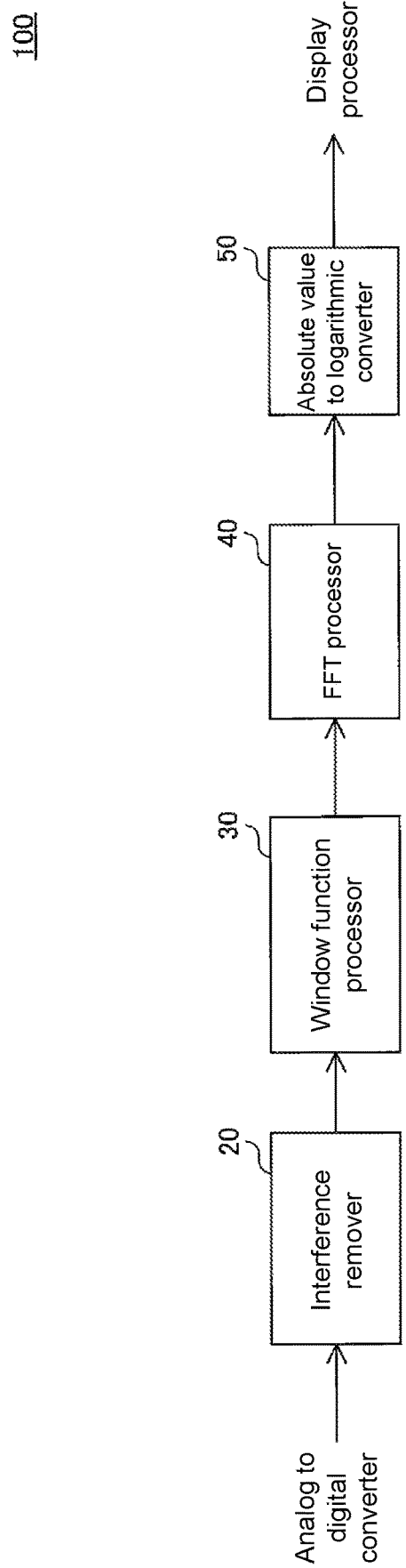
FIG. 2 illustrates a configuration of a signal processor in a radar device according to an embodiment of the disclosure.

FIG. 2 illustrates a configuration of a signal processor in a radar device according to an embodiment of the disclosure. Referring to FIG. 2, the signal processor 100 includes an interference remover 20, a window function processor 30, an FFT processor 40, and an absolute value to logarithmic processor 50.

The interference remover 20 may receive N beat signals SD from the A/D converter 170, and perform FFT preprocessing configured to remove an interference component (a component based on an interference wave) from components of the received beat signal SD every sweep period T. The interference remover 20 may output a beat signal SD from which the interference component has been removed by the FFT preprocessing to the window function processor 30. The FFT preprocessing performed by the interference remover 20 will be described in detail later.

The window function processor 30 may perform window function processing configured to multiply the N beat signals SD after FFT processing received from the interference remover 20 by a particular window function every sweep period T. The window function processor 30 may output the beat signal SD after window function processing to the FFT processor 40.

The FFT processor 40 may generate a power spectrum P by performing FFT processing on the N beat signals SD received from the window function processor 30, and output the generated power spectrum P to the absolute value to logarithmic converter 50 every sweep period T. For example, a frequency in the power spectrum P generated by the FFT processor 40 corresponds to the distance between the radar device 300 and the target.

The absolute value to logarithmic converter 50 may generate the echo data by logarithmic transformation of a power spectrum PA indicating an absolute value of the power spectrum P received from the FFT processor 40, and output the generated echo data to the display processor 202.

<Interference Remover>

Figure 3:
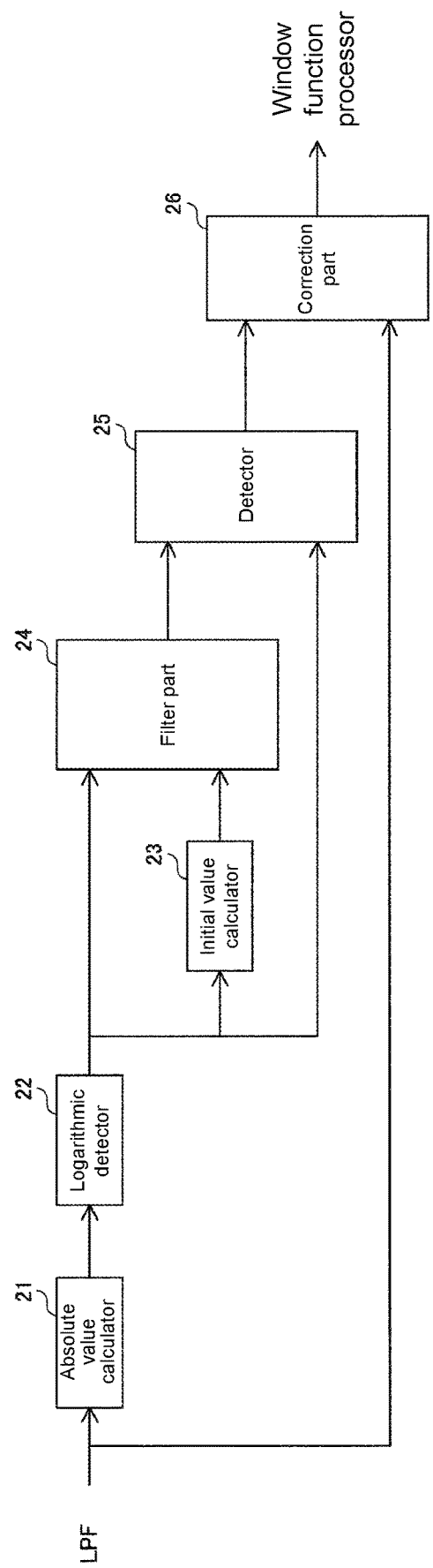
FIG. 3 illustrates a configuration of an interference remover in a signal processor according to an embodiment of the disclosure.

FIG. 3 illustrates a configuration of an interference remover in a signal processor according to an embodiment of the disclosure. Referring to FIG. 3, the interference remover 20 includes an absolute value calculator 21, a logarithmic detector 22, an initial value calculator 23, a filter part 24, a detector 25, and a correction part 26. As described above, the interference remover 20 may perform the FFT preprocessing configured to remove the interference component from the components of the beat signal SD received from the A/D converter 170. The absolute value calculator 21 and the correction part 26 may receive the beat signal SD(n) composed of a pair of the I signal Si(n) and the Q signal Sq(n) from the A/D converter 170.

The absolute value calculator 21 may receive the beat signal SD from the A/D converter 170 and calculate an absolute value a of the received beat signal SD. More specifically, the absolute value calculator 21 may calculate the sum of the square of the value of the I signal Si(n) and the square of the value of the Q signal Sq(n) as an absolute value a(n), and output the calculated absolute value a(n) to the logarithmic detector 22.

The logarithmic detector 22 may calculate a logarithmic detection value B by performing logarithmic detection of the absolute value a received from the absolute value calculator 21. More specifically, the logarithmic calculator 22 may receive the absolute value a(n) from the absolute value calculator 21 and calculate $10 \times \log\{a(n)\}$ as a logarithmic detection value B(n), and output the calculated logarithmic detection value B(n) to the initial value calculator 23, the filter part 24, and the detector 25. Here, Log{A} represents a common logarithm of A.

The initial value calculator 23 may calculate an average value AvB of the logarithmic detection value B corresponding to an initial given time in each sweep period T. More specifically, the initial value calculator 23 may calculate the average value AvB from a first logarithmic detection value B(1) to a kth logarithmic detection value B(k) in the sweep period T. Here, k is an integer equal to or greater than 2 and less than N, and is, for example, 8. The initial value calculator 23 may output the calculated average value AvB to the filter part 24.

The filter part 24 may perform filtering on an nth logarithmic detection value B(n) being a signal based on the nth beat signal SD(n) using a smoothing filter in a time domain, thereby generating an nth filter signal A(n). Herein, the filter signal is also referred to as a smoothed signal. The filter part 24 may output the generated filter signal A(n) to the detector 25. The logarithmic detection value B(n) is an example of a processing signal. For example, the smoothing filter is an infinite impulse response (IIR) filter, which is one of digital filters.

For example, the filter part 24 may change a setting of the smoothing filter based on a comparison result between a filter signal A(n−1) and the logarithmic detection value B(n) input to the smoothing filter. Specifically, the filter part 24 may change a filtering equation as the setting of the smoothing filter.

More specifically, in the case where the filter signal A(n−1) and the logarithmic detection value B(n) satisfy the following Equation (1), the filter part 24 may generate the filter signal A(n) according to the following Equation (3). On the other hand, in the case where the filter signal A(n−1) and the logarithmic detection value B(n) satisfy the following Equation (2), the filter part 24 may generate the filter signal A(n) according to the following Equation (4). A particular threshold ThA in Equations (1) and (2) is a value set in advance in order to prevent the filter signal A(n) generated by the filter part 24 from following an increase in the logarithmic detection value B(n) due to an interference wave received by the receiver 150. C in Equation (3) is a particular coefficient having a value equal to or greater than zero and equal to or less than 1.

$$B(n)-A(n-1) \leq ThA \qquad (1)$$

$$B(n)-A(n-1) > ThA \qquad (2)$$

$$A(n)=B(n) \times C+A(n-1) \times (1-C) \qquad (3)$$

$$A(n)=A(n-1) \qquad (4)$$

Here, for example, the filter part 24 may determine the average value AvB of multiple logarithmic detection values B(n) as an initial value of the filter signal A(n). More specifically, the filter part 24 may output, as the initial value of the filter signal A(n), the average value AvB received from the initial value calculator 23 to the detector 25 in each sweep period T regardless of Equations (1) to (4).

For example, in the case where a change in the logarithmic detection value B(n) input to the smoothing filter satisfies a particular condition, the filter part 24 may change the smoothing filter to a setting to further suppress a temporal change in the filter signal A(n). More specifically, in the case where Equation (2) is satisfied due to a large change in the logarithmic detection value B(n) input to the smoothing filter, the filter part 24 may set the nth filter signal A(n) to the same value as an (n−1)th filter signal A(n−1), thereby suppressing a temporal change in the filter signal A(n).

Figure 4:
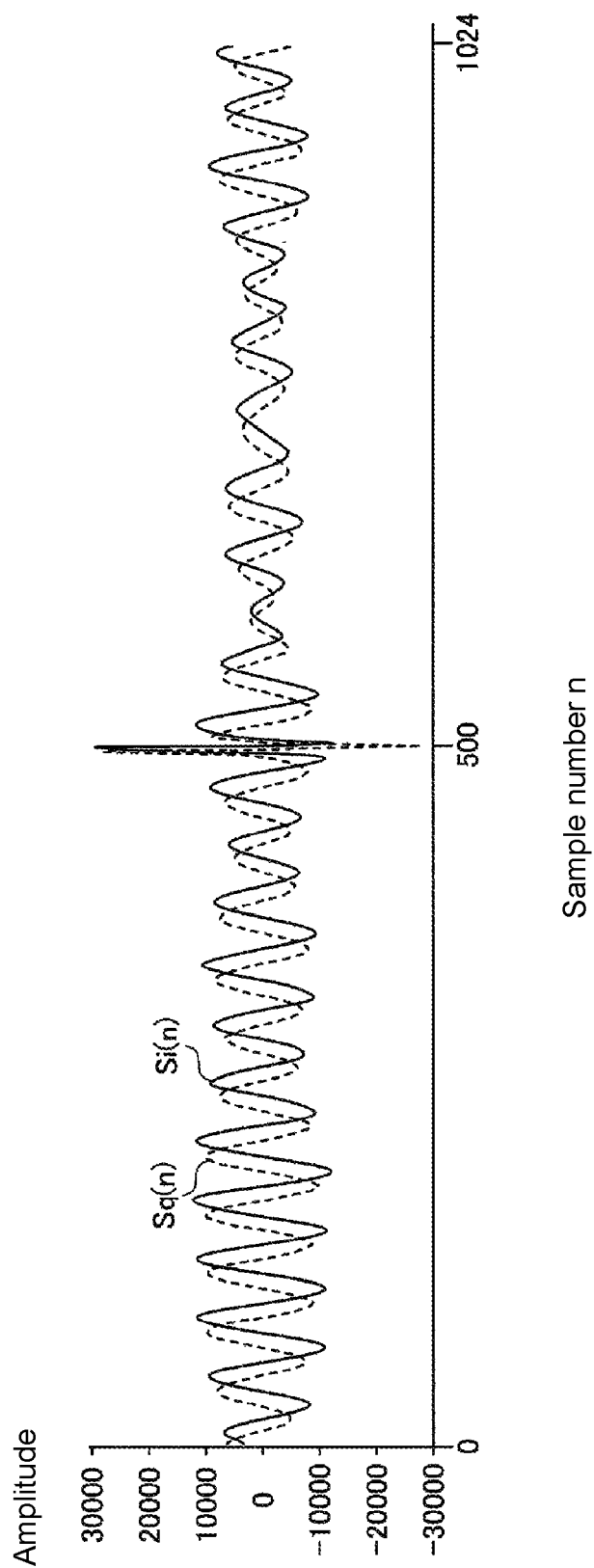
FIG. 4 illustrates an example of a beat signal received by an interference remover in a signal processor according to an embodiment of the disclosure.

FIG. 4 illustrates an example of a beat signal received by an interference remover in a signal processor according to an embodiment of the disclosure. In FIG. 4, the horizontal axis indicates the value of the sample number n of the beat signal SD(n), and the vertical axis indicates amplitude. The solid line in FIG. 4 indicates the I signal Si(n) in the beat signal SD(n). The broken line in FIG. 4 indicates the Q signal Sq(n) in the beat signal SD(n).

Figure 5:
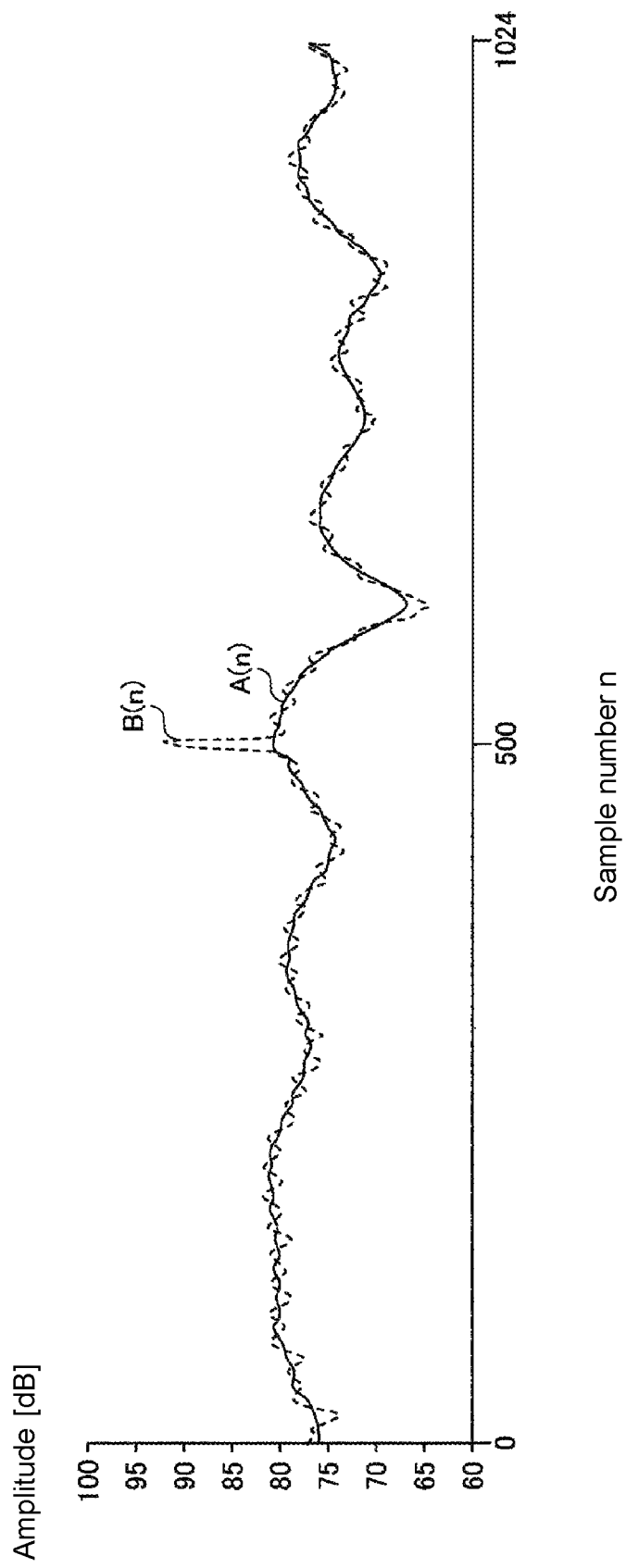
FIG. 5 illustrates an example of a logarithmic detection value received by a filter part in an interference remover of a signal processor and a filter signal generated by the filter part according to an embodiment of the disclosure.

FIG. 5 illustrates an example of a logarithmic detection value received by a filter part in an interference remover of a signal processor and a filter signal generated by the filter part according to an embodiment of the disclosure. In FIG. 5, the horizontal axis indicates the value of the sample number n of the beat signal SD(n), and the vertical axis indicates amplitude [dB]. The solid line in FIG. 5 indicates the filter signal A(n) generated by the filter part 24. The broken line in FIG. 5 indicates the logarithmic detection value B(n) received by the filter part 24.

Referring to FIG. 4 and FIG. 5, since the amplitude of the I signal Si(n) and the Q signal Sq(n) when the sample number n is about 500 may sharply increase due to the influence of an interference wave, the level of an approximately 500th logarithmic detection value B(n) may suddenly become a large value. While the filter signal A(n) generated by the filter part 24 follows a gradual change in the level of the logarithmic detection value B(n), the filter signal A(n) does not follow a sudden change in the level of the logarithmic detection value B(n).

The detector 25 may detect an interference signal included in the beat signal SD(n) based on the logarithmic detection value B(n) and the filter signal A(n).

For example, the detector 25 may detect the interference signal based on a comparison result between the logarithmic detection value B(n) and the filter signal A(n). More specifically, the detector 25 may detect the interference signal based on a difference or ratio between the logarithmic detection value B(n) and the filter signal A(n).

Specifically, in the case where the logarithmic detection value B(n) received from the logarithmic detector 22 and the filter signal A(n) received from the filter part 24 satisfy the following Equation (5), the detector 25 may determine that the interference signal is included in the beat signal SD(n). ThB in Equation (5) is a particular threshold.

$$B(n)-A(n) \geq ThB \qquad (5)$$

Figure 6:
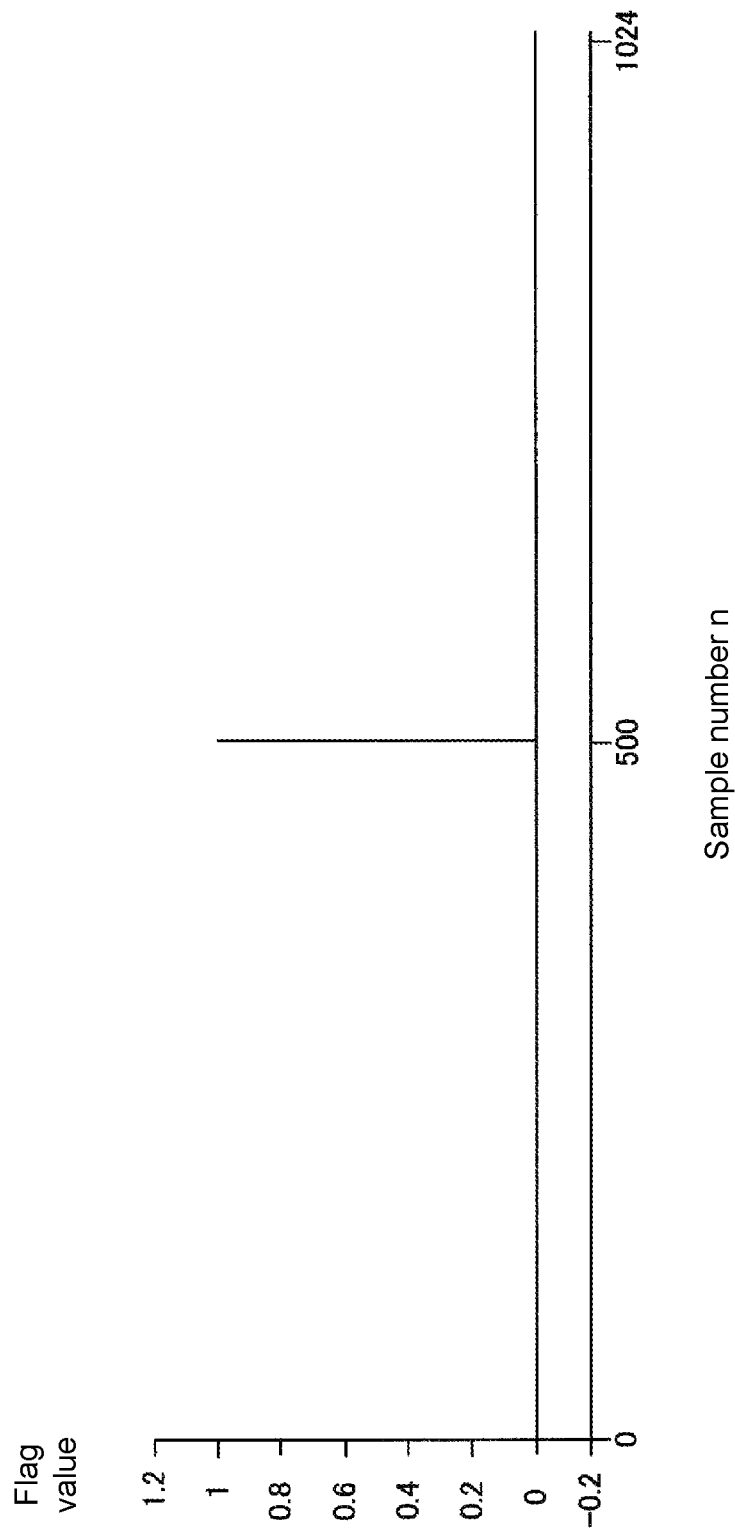
FIG. 6 illustrates an example of an interference determination flag generated by a detector in an interference remover of a signal processor according to an embodiment of the disclosure.

FIG. 6 illustrates an example of an interference determination flag generated by a detector in an interference remover of a signal processor according to an embodiment of the disclosure. In FIG. 6, the horizontal axis indicates the value of the sample number n of the beat signal SD(n), and the vertical axis indicates flag value.

Referring to FIG. 6, the detector 25 may generate an interference determination flag in which a flag value corresponding to the sample number n of the beat signal SD(n) determined to include the interference signal is 1, and a flag value corresponding to the sample number n of the beat signal SD(n) determined to not include the interference signal is zero. Specifically, the detector 25 may generate the interference determination flag in which the flag value is 1 when the sample number n is about 500. The detector 25 may output the generated interference determination flag to the correction part 26.

The correction part 26 may perform signal processing (that is, FFT preprocessing) configured to attenuate an amplitude of the interference signal. More specifically, the correction part 26 may receive the beat signal SD(n) from the A/D converter 170, and perform the FFT preprocessing configured to attenuate the amplitude of the beat signal SD(n) in the received beat signal SD(n) that has the sample number n when the flag value in the interference determination flag received from the detector 25 is 1. Hereinafter, the sample number n when the flag value in the interference determination flag is 1 is defined as nx.

For example, as the FFT preprocessing, the correction part 26 may replace the amplitude of an I signal Si(nx) and a Q signal Sq(nx) in the I signal Si(n) and Q signal Sq(n) in the received beat signal SD(n) that have the sample number nx with zero. The correction part 26 may output the beat signal SD(n) after FFT preprocessing to the window function processor 30.

Referring again to FIG. 2, as described above, the window function processor 30 may perform the window function processing on the beat signal SD(n) after FFT processing received from the interference remover 20, and output the beat signal SD(n) after window function processing to the FFT processor 40. Then, the FFT processor 40 may generate a power spectrum by performing the FFT processing on the beat signal SD received from the window function processor 30.

Figure 7:
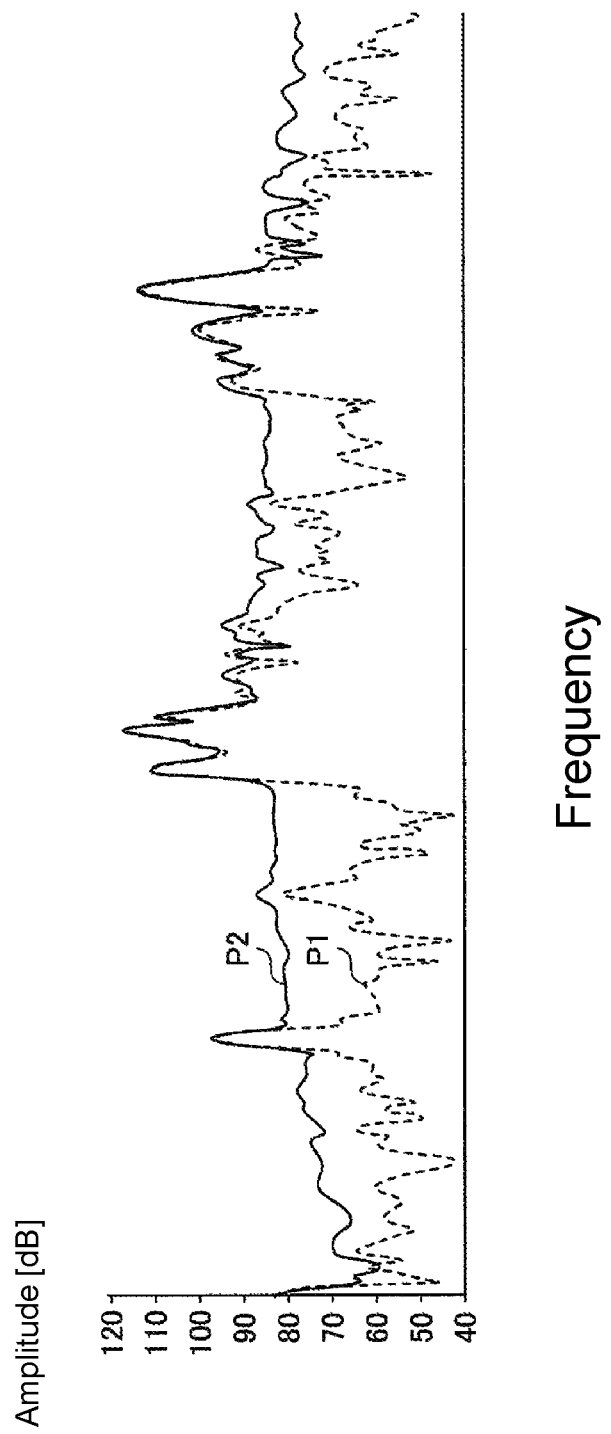
FIG. 7 illustrates an example of a power spectrum generated by an FFT processor in a signal processor according to an embodiment of the disclosure.

FIG. 7 illustrates an example of a power spectrum generated by an FFT processor in a signal processor according to an embodiment of the disclosure. In FIG. 7, the horizontal axis indicates frequency and the vertical axis indicates amplitude [dB]. The broken line in FIG. 7 indicates an example of a power spectrum P1 generated by the FFT processor 40 in the case where the FFT preprocessing is performed by the interference remover 20. The solid line in FIG. 7 indicates an example of a power spectrum P2 generated by the FFT processor 40 in the case where no FFT preprocessing is performed.

Referring to FIG. 7, the power spectrum P2 generated by the FFT processor 40 in the case where no FFT preprocessing is performed has a low SN ratio due to the influence of the interference wave. In contrast, the power spectrum P1 generated by the FFT processor 40 in the case where the FFT preprocessing is performed by the interference remover 20 has a higher SN ratio than the power spectrum P2, and a peak can be relatively accurately detected. Accordingly, the target in the detection target area can be correctly detected.

By the way, for example, in a conventional pulse radar, it is a general detection method that the interference signal is detected based on a comparison result between signal levels of received signals in the azimuth direction. Specifically, in the conventional pulse radar, for example, the signal levels of the received signals in the divided target areas adjacent to each other are compared, and it is determined that the received signal having a protruding amplitude as compared with the received signal in the adjacent divided target area includes the interference signal.

However, in the case of applying the above detection method used in the pulse radar to, for example, an FM-CW radar device, the SN ratio of the power spectrum may decrease. Hereinafter, a specific description will be given.

Figure 8:
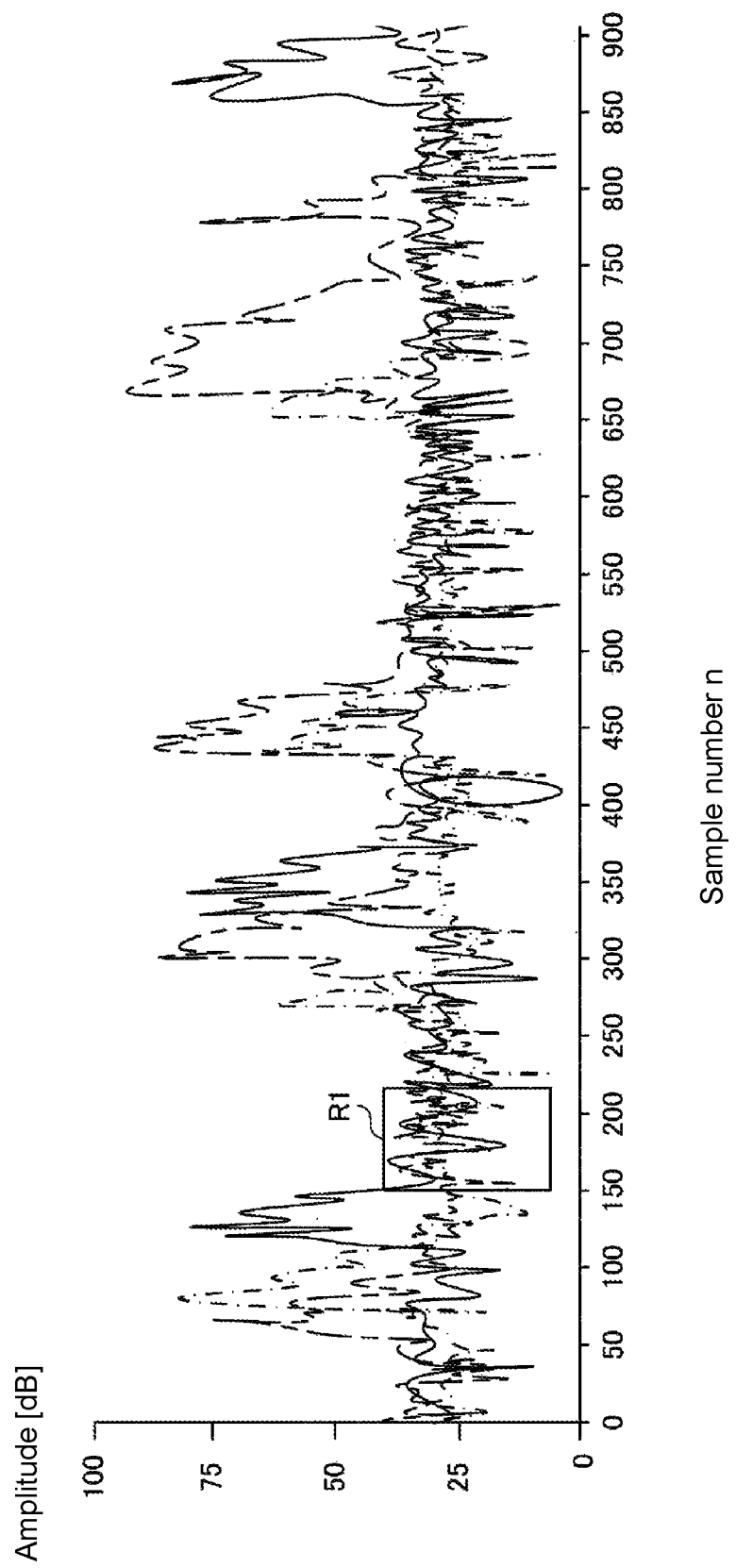
FIG. 8 illustrates an example of a logarithmic detection value generated in a radar device according to an embodiment of the disclosure.
Figure 9:
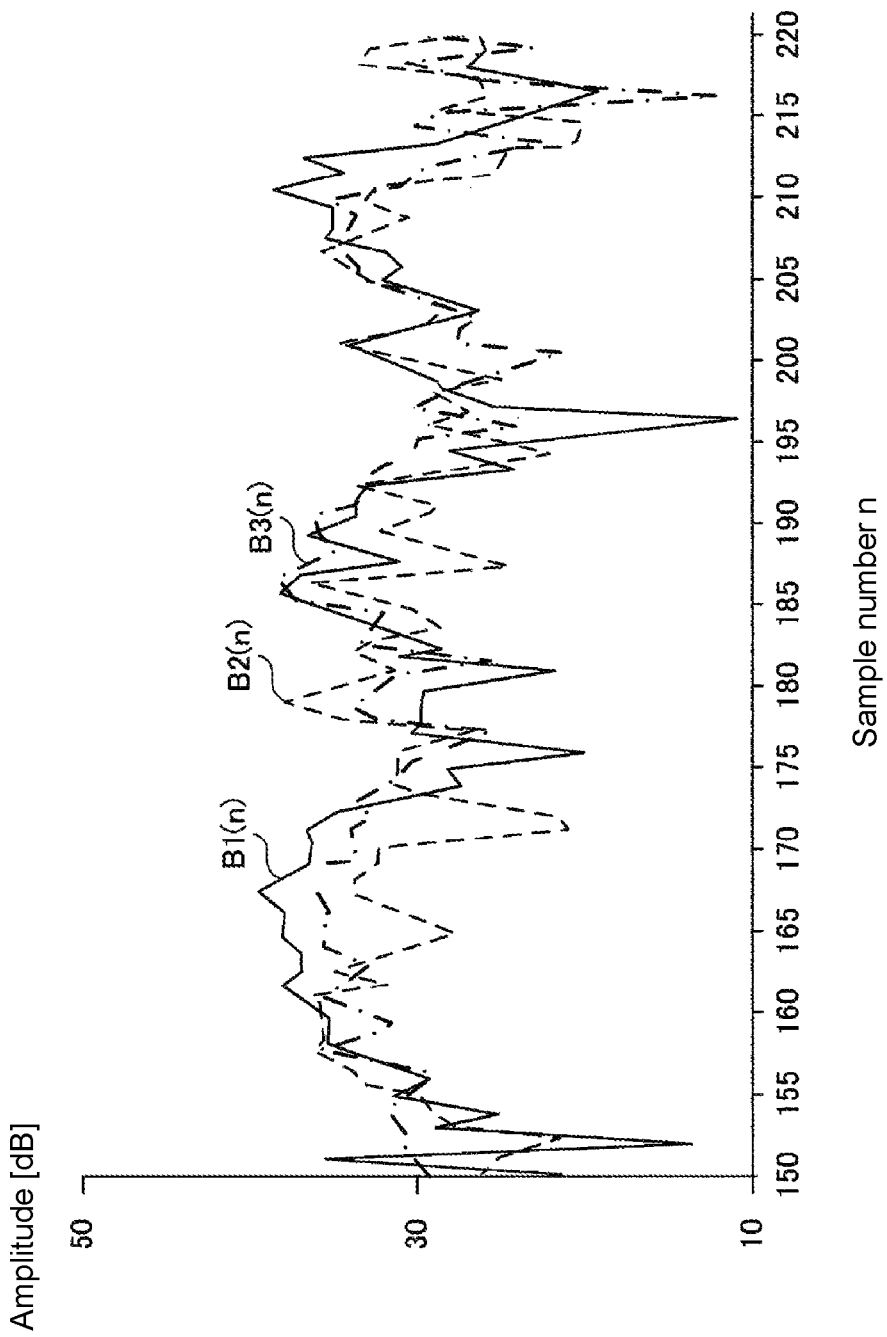
FIG. 9 illustrates an example of a logarithmic detection value generated in a radar device according to an embodiment of the disclosure.

FIG. 8 and FIG. 9 illustrate an example of a logarithmic detection value generated in a radar device according to an embodiment of the disclosure. FIG. 9 is an enlarged view of a region R1 in FIG. 8. In FIG. 8 and FIG. 9, the horizontal axis indicates the value of the sample number n of the beat signal SD(n), and the vertical axis indicates amplitude [dB]. The solid line in FIG. 8 and FIG. 9 indicates a logarithmic detection value B1($n$) based on a beat signal SD1($n$) corresponding to a divided target area Ar1. The broken line in FIG. 8 and FIG. 9 indicates a logarithmic detection value B2($n$) based on a beat signal SD2($n$) corresponding to a divided target area Ar2 adjacent to the divided target area Ar1. The chain line in FIG. 8 and FIG. 9 indicates a logarithmic detection value B3($n$) based on a beat signal SD3($n$) corresponding to a divided target area Ar3 adjacent to the divided target area Ar2.

In FIG. 8, in the logarithmic detection values B1($n$), B2($n$), and B3($n$), protrusion of the amplitude exceeding, for example, 50 dB, is due to the influence of the interference wave.

Referring to FIG. 9, the logarithmic detection values B1($n$), B2($n$), and B3($n$) may have different amplitudes even if the amplitude is 50 dB or less and there is no influence from the interference wave. Therefore, in the FM-CW radar device, in the case of attempting to detect the interference signal based on a comparison result between signal levels of the logarithmic detection value B in the azimuth direction as in the above detection method in the pulse radar, it may be erroneously determined that the logarithmic detection value B includes the interference signal when there is no influence from the interference wave. When the erroneously determined interference signal is removed, the SN ratio of the generated power spectrum may decrease.

In contrast, in the signal processor 100 according to an embodiment of the disclosure, compared to the configuration to detect the interference signal based on the comparison result between the signal levels of the logarithmic detection value B in the azimuth direction, by the configuration to detect the interference signal based on the filter signal generated by filtering the logarithmic detection value B using the smoothing filter in the time domain and the logarithmic detection value B, erroneous determination of the interference signal can be suppressed and the interference signal can be more accurately detected. Thus, a decrease in the SN ratio of the power spectrum P generated based on the beat signal SD can be suppressed.

Modifications

Figure 10:
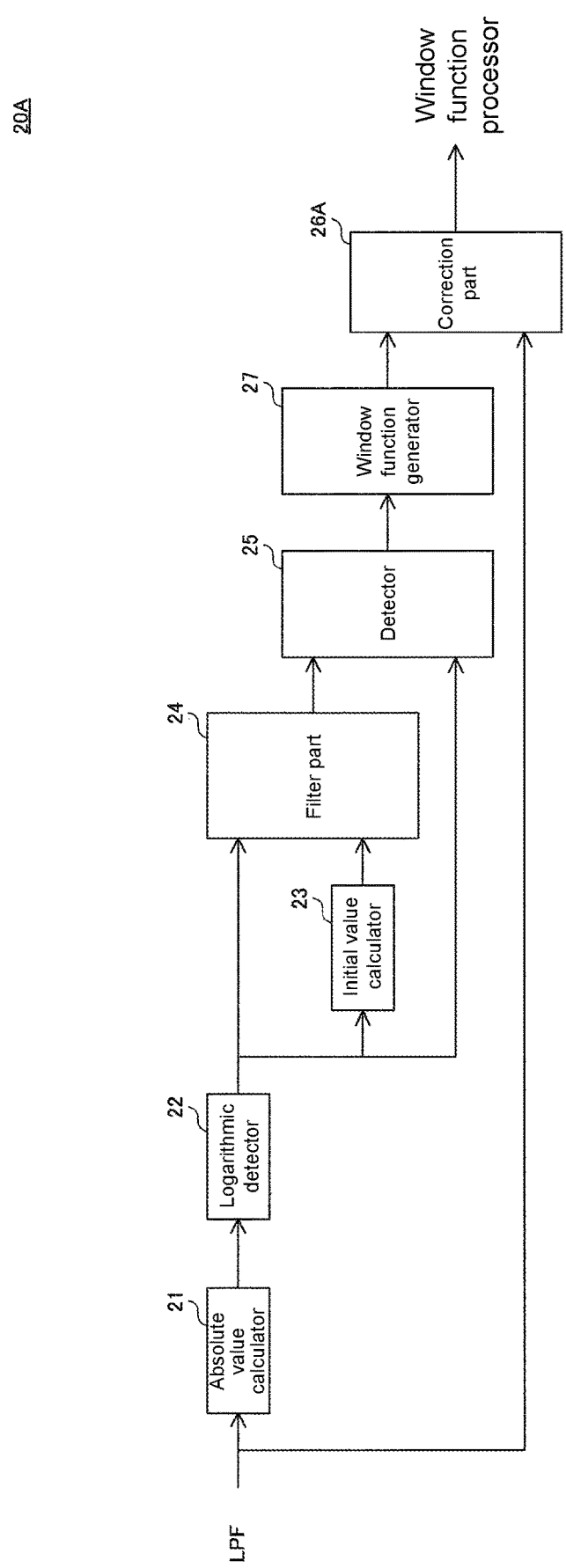
FIG. 10 illustrates a configuration of an interference remover according to a modification of an embodiment of the disclosure.

FIG. 10 illustrates a configuration of an interference remover according to a modification of an embodiment of the disclosure. Referring to FIG. 10, compared to the interference remover 20, an interference remover 20A includes a correction part 26A instead of the correction part 26, and further includes a window function generator 27. The signal processor 100 may be configured to include the interference remover 20A instead of the interference remover 20.

Figure 11:
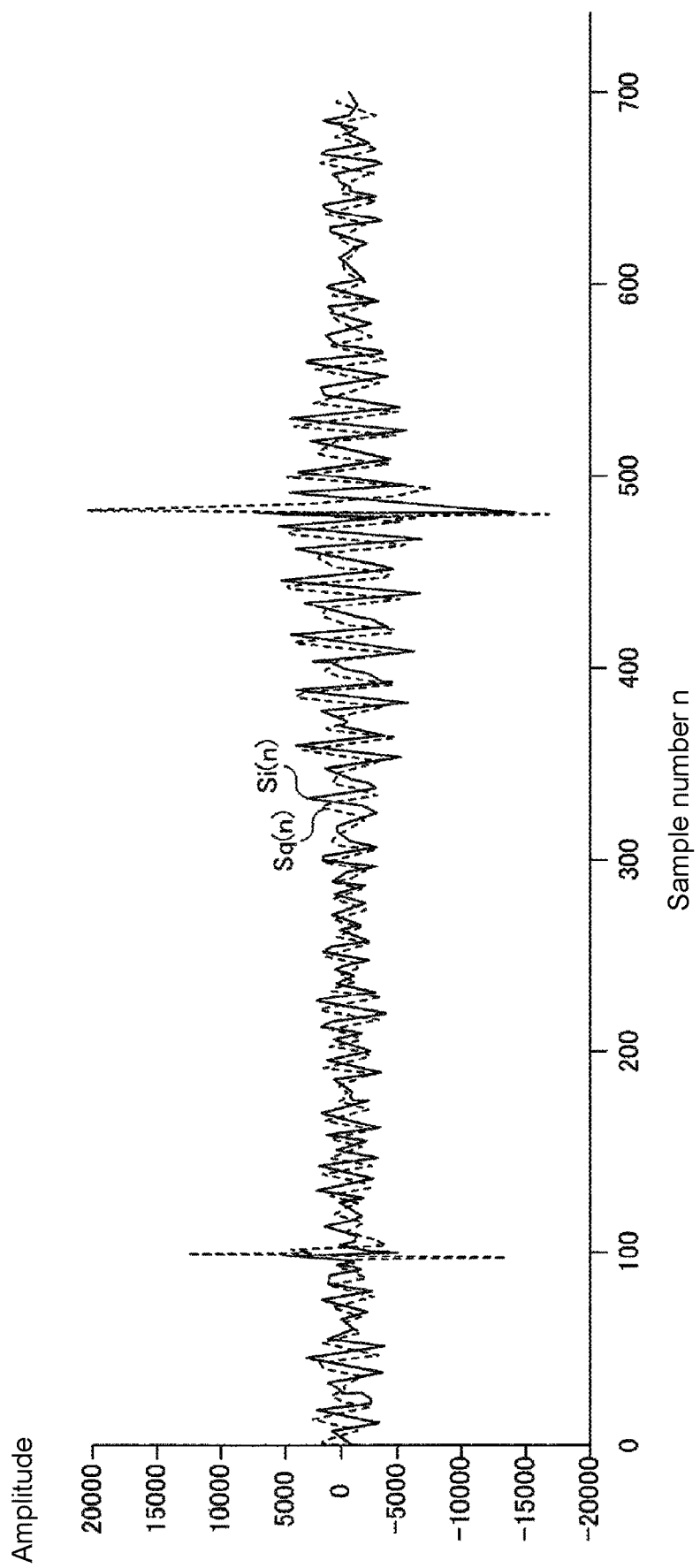
FIG. 11 illustrates an example of a beat signal received by an interference remover in a signal processor according to a modification of an embodiment of the disclosure.

FIG. 11 illustrates an example of a beat signal received by an interference remover in a signal processor according to a modification of an embodiment of the disclosure. In FIG. 11, the horizontal axis indicates the value of the sample number n of the beat signal SD(n), and the vertical axis indicates amplitude. The solid line in FIG. 11 indicates the I signal Si(n) in the beat signal SD(n). The broken line in FIG. 11 indicates the Q signal Sq(n) in the beat signal SD(n).

Referring to FIG. 11, due to the influence of the interference wave, the amplitude of the I signal Si(n) and Q signal Sq(n) when the sample number n is about 100 as well as the amplitude of the I signal Si(n) and Q signal Sq(n) when the sample number n is about 480 may sharply increase.

Figure 12:
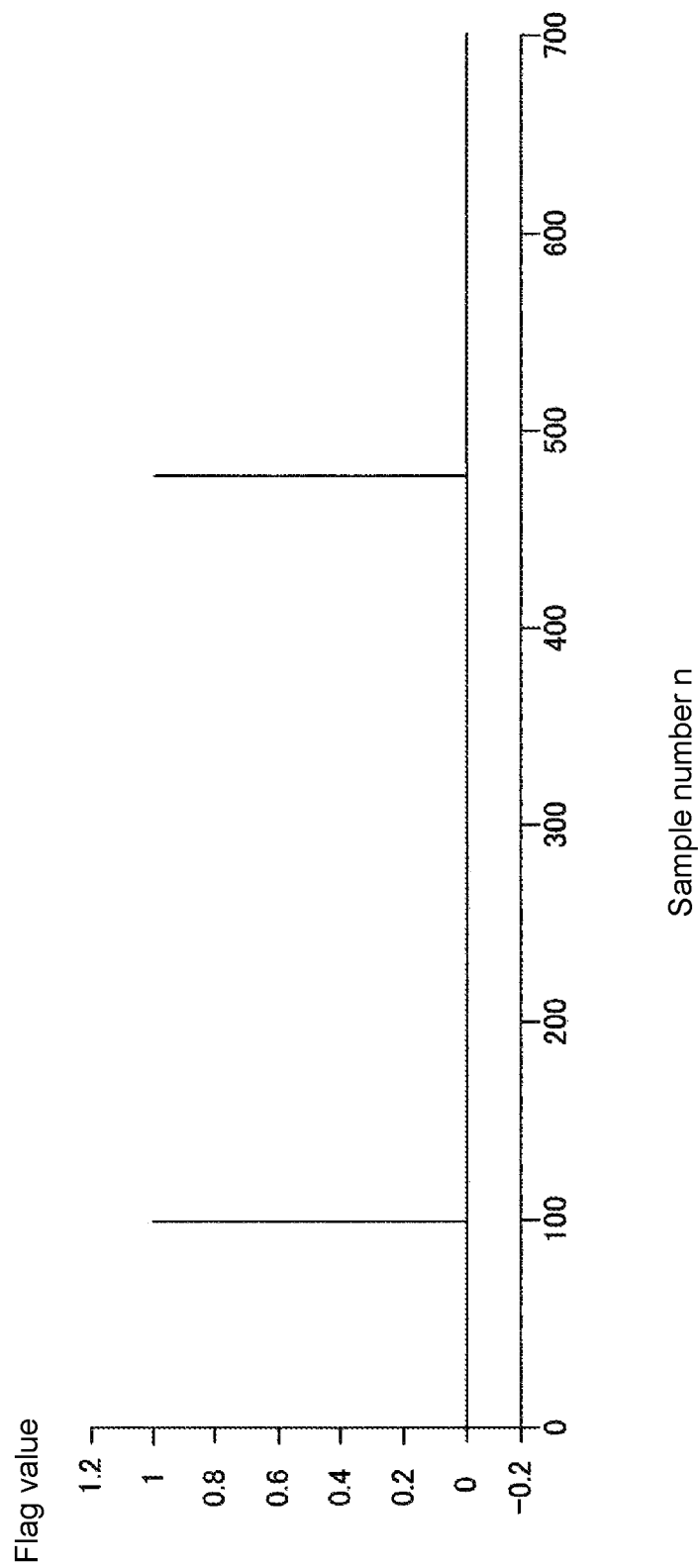
FIG. 12 illustrates an example of an interference determination flag generated by a detector in an interference remover of a signal processor according to a modification of an embodiment of the disclosure.

FIG. 12 illustrates an example of an interference determination flag generated by a detector in an interference remover of a signal processor according to a modification of an embodiment of the disclosure. In FIG. 12, the horizontal axis indicates the value of the sample number n of the beat signal SD(n), and the vertical axis indicates flag value.

Referring to FIG. 12, the detector 25 may generate the interference determination flag in which the flag value when the sample number n is about 100 and the flag value when the sample number n is about 480 are 1. The detector 25 may output the generated interference determination flag to the window function generator 27.

The window function generator 27 may receive the interference determination flag from the detector 25, and generate a window function Wf based on the received interference determination flag.

Figure 13:
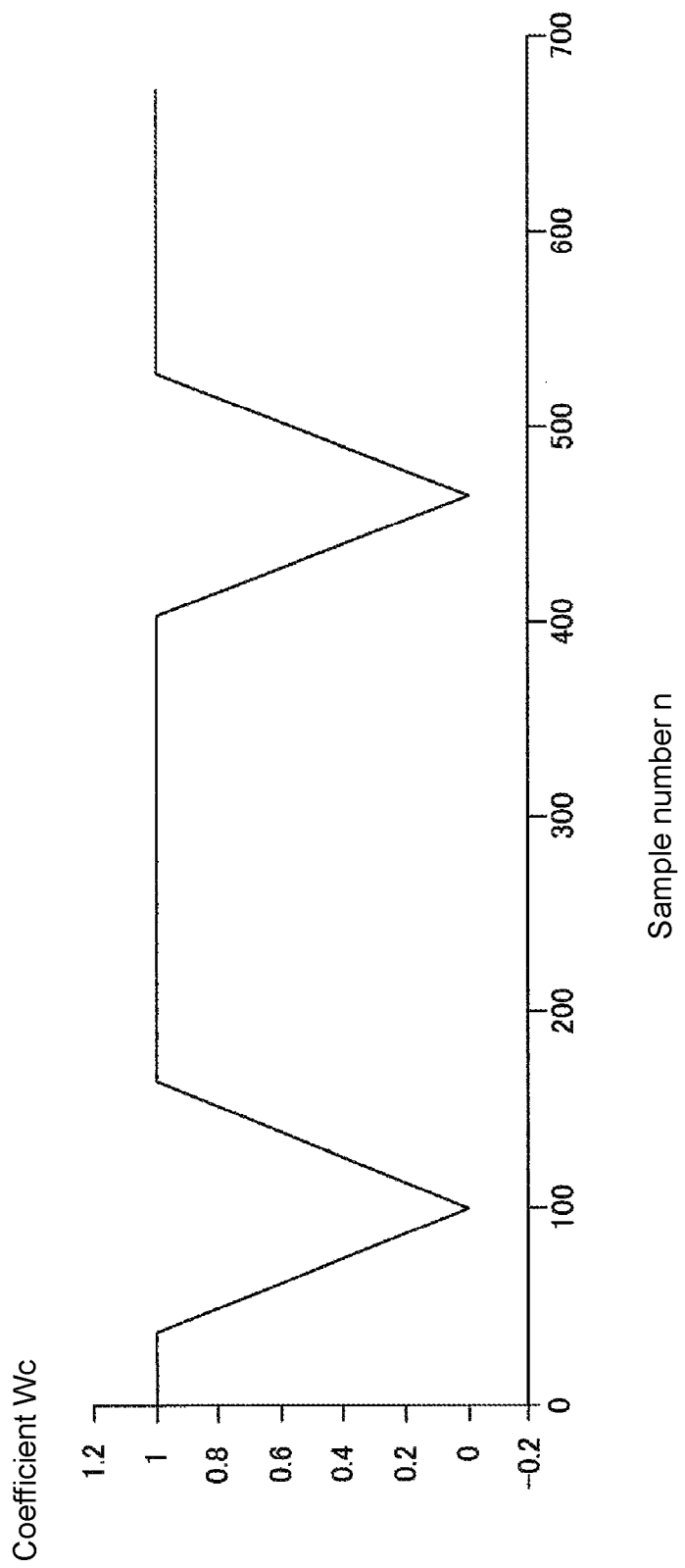
FIG. 13 illustrates an example of a window function generated by a window function generator in an interference remover of a signal processor according to a modification of an embodiment of the disclosure.

FIG. 13 illustrates an example of a window function generated by a window function generator in an interference remover of a signal processor according to a modification of an embodiment of the disclosure. In FIG. 13, the horizontal axis indicates the value of the sample number n of the beat signal SD(n), and the vertical axis indicates a coefficient Wc of a window function.

Referring to FIG. 13, the window function generator 27 may generate the window function Wf in which the coefficient Wc of the sample number nx is zero when the flag value in the interference determination flag is 1, and the coefficient Wc may linearly increase and approach 1 as the sample number n increases or decreases from nx. The window function generator 27 may output the generated window function Wf to the correction part 26A. The window function generator 27 may be configured to generate the window function Wf in which the coefficient Wc increases curvedly like, for example, a sine curve, as the sample number n increases or decreases from nx.

By multiplying the beat signal SD(n) by the window function Wf, the correction part 26A may perform the signal processing (that is, FFT preprocessing) configured to attenuate the amplitude of the beat signal SD(n) in a domain including the interference signal. More specifically, the correction part 26A may receive the beat signal SD(n) from the A/D converter 170, and perform the window function processing configured to multiply the received beat signal SD(n) by the window function Wf received from the window function generator 27. The correction part 26A may output the beat signal SD(n) after window function processing to the window function processor 30.

Figure 14:
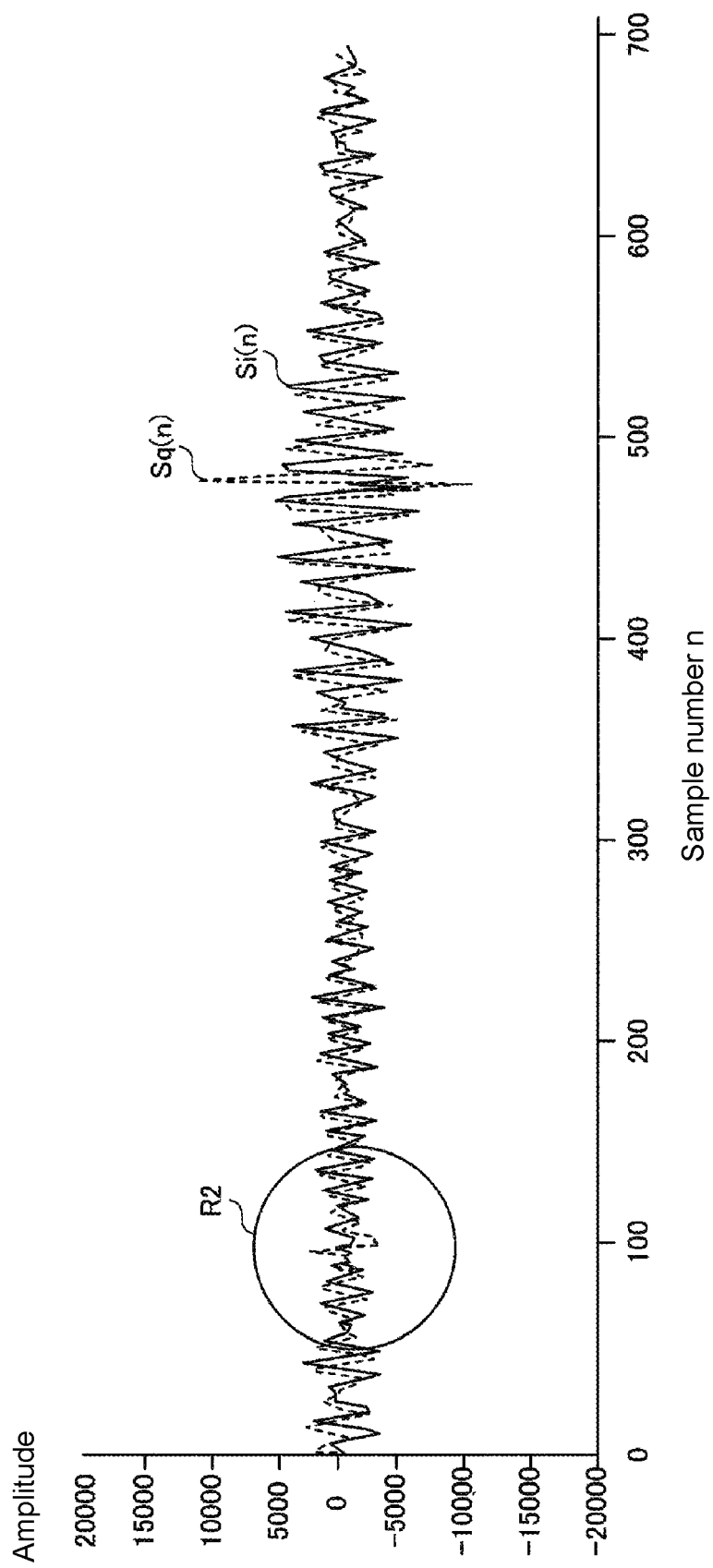
FIG. 14 illustrates an example of a beat signal after FFT preprocessing by a correction part in an interference remover according to an embodiment of the disclosure.
Figure 15:
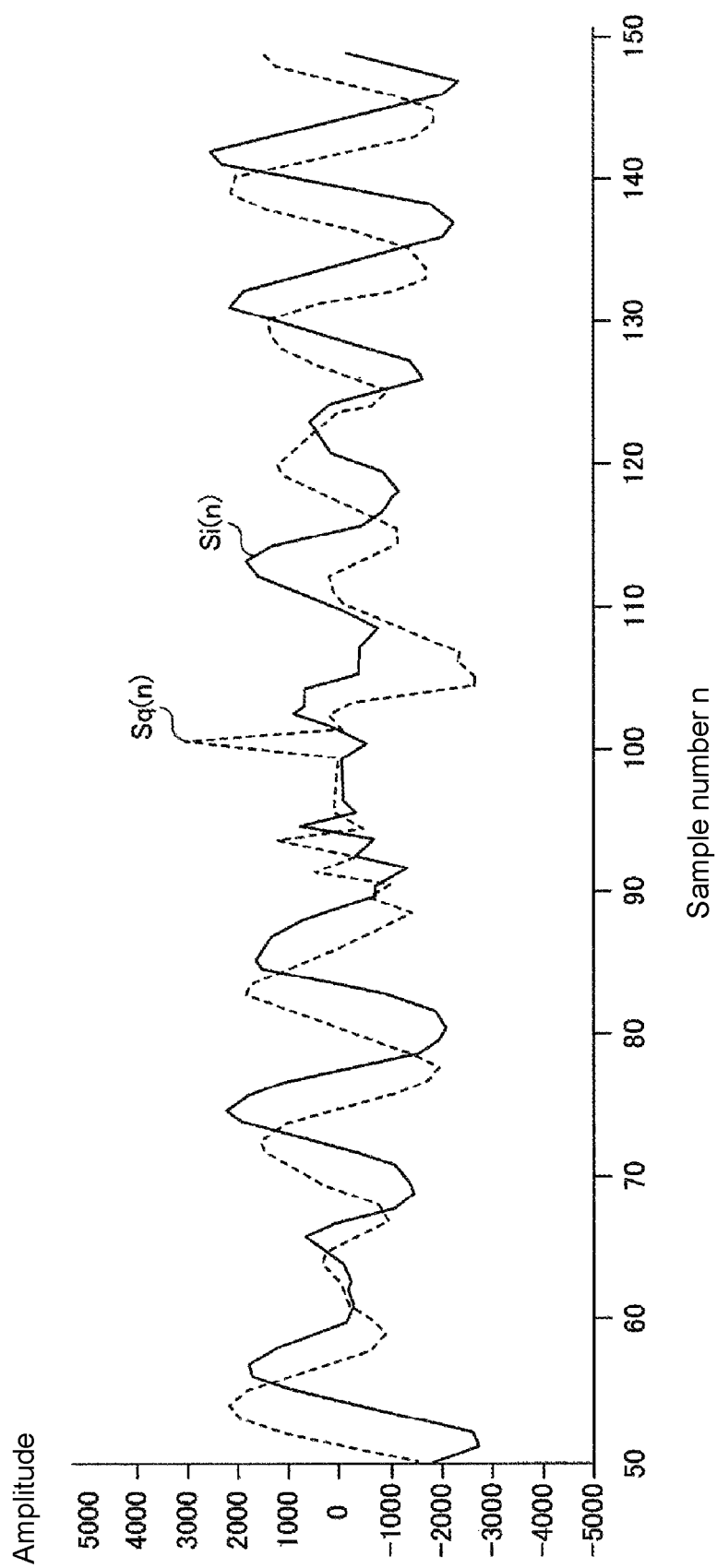
FIG. 15 illustrates an example of a beat signal after FFT preprocessing by a correction part in an interference remover according to an embodiment of the disclosure.

FIG. 14 and FIG. 15 illustrate an example of a beat signal after FFT preprocessing by a correction part in an interference remover according to an embodiment of the disclosure. FIG. 15 is an enlarged view of a region R2 in FIG. 14. In FIG. 14 and FIG. 15, the horizontal axis indicates the value of the sample number n of the beat signal SD(n), and the vertical axis indicates amplitude. The solid line in FIG. 14 and FIG. 15 indicates the I signal Si(n) in the beat signal SD(n) after the FFT preprocessing by the correction part 26. The broken line in FIG. 14 and FIG. 15 indicates the Q signal Sq(n) in the beat signal SD(n) after the FFT preprocessing by the correction part 26.

Figure 16:
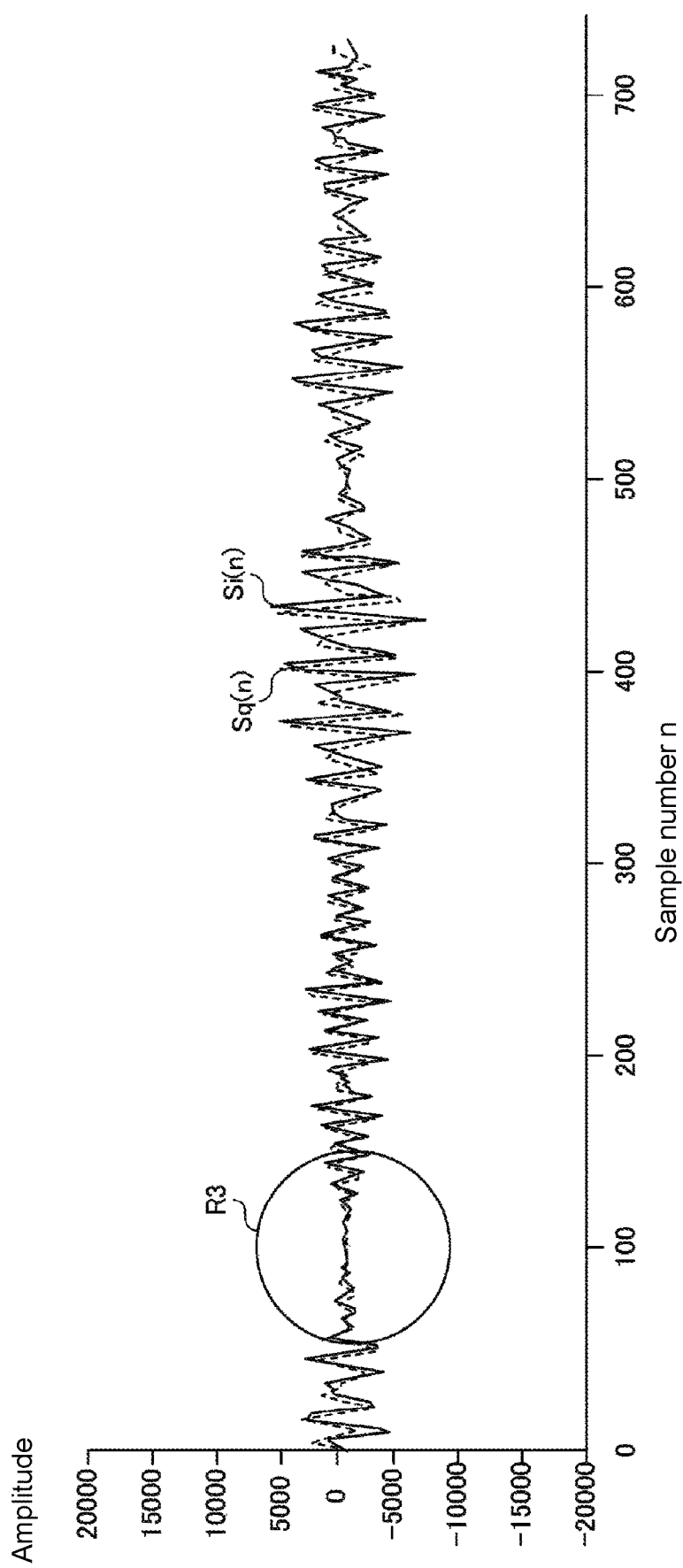
FIG. 16 illustrates an example of a beat signal after FFT preprocessing by a correction part in an interference remover according to a modification of an embodiment of the disclosure.
Figure 17:
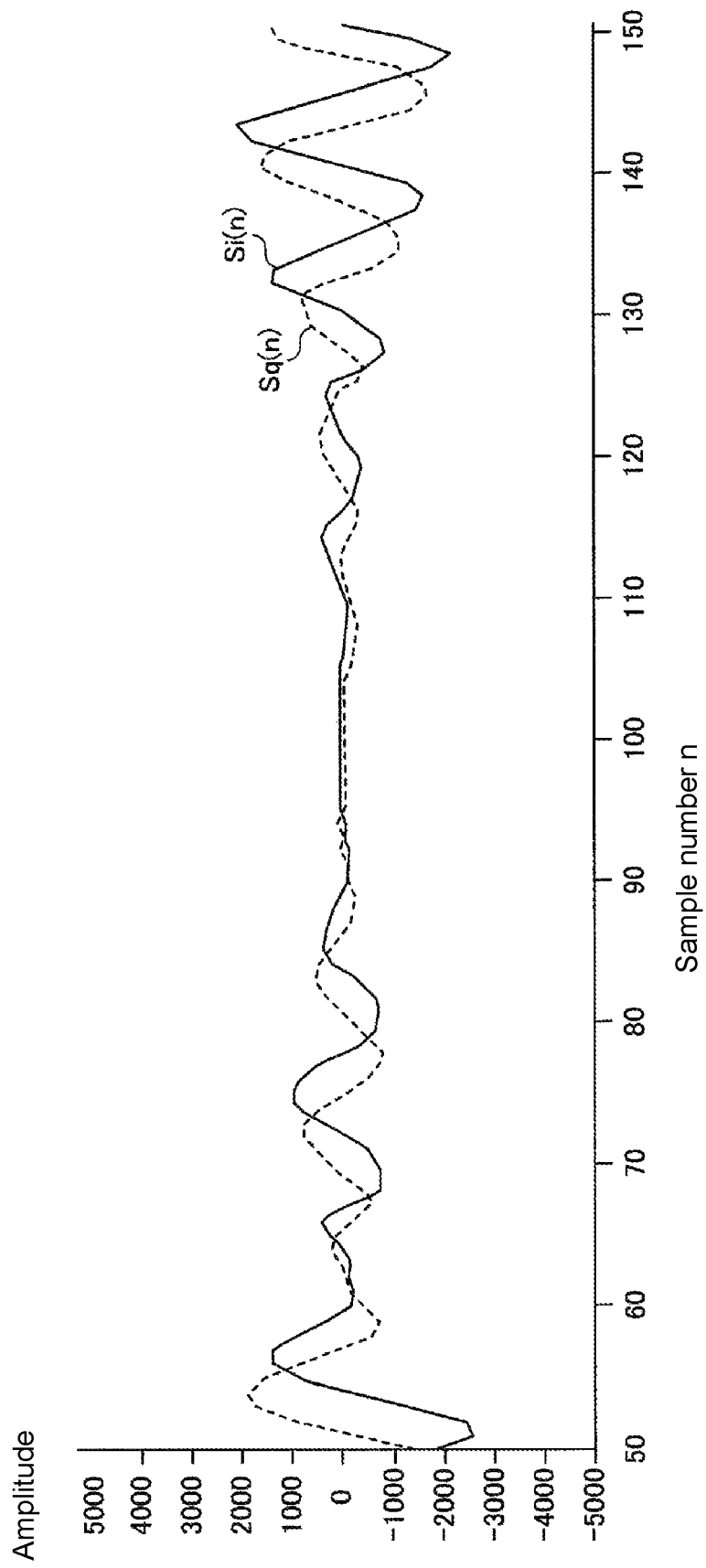
FIG. 17 illustrates an example of a beat signal after FFT preprocessing by a correction part in an interference remover according to a modification of an embodiment of the disclosure.

FIG. 16 and FIG. 17 illustrate an example of a beat signal after FFT preprocessing by a correction part in an interference remover according to a modification of an embodiment of the disclosure. FIG. 17 is an enlarged view of a region R3 in FIG. 16. In FIG. 16 and FIG. 17, the horizontal axis indicates the value of the sample number n of the beat signal SD(n), and the vertical axis indicates amplitude. The solid line in FIG. 16 and FIG. 17 indicates the I signal Si(n) in the beat signal SD(n) after the FFT preprocessing by the correction part 26A. The broken line in FIG. 16 and FIG. 17 indicates the Q signal Sq(n) in the beat signal SD(n) after the FFT preprocessing by the correction part 26A.

Referring to FIG. 15 and FIG. 17, in the beat signal SD(n) after the FFT preprocessing by the correction part 26, by replacing the amplitude of the I signal Si(nx) and Q signal Sq(nx) having the sample number nx when the flag value in the interference determination flag is 1, the I signal Si(n) and Q signal Sq(n) having the sample number n before and after nx may sharply change, that is, discontinuity may occur. In contrast, in the beat signal SD(n) after the FFT preprocessing by the correction part 26A, by multiplying the beat signal SD(n) by the window function Wf, the amplitude of the I signal Si(n) and Q signal Sq(n) having the sample number n before and after nx may gradually change without suddenly increasing or decreasing. Thus, no discontinuity occurs.

Figure 18:
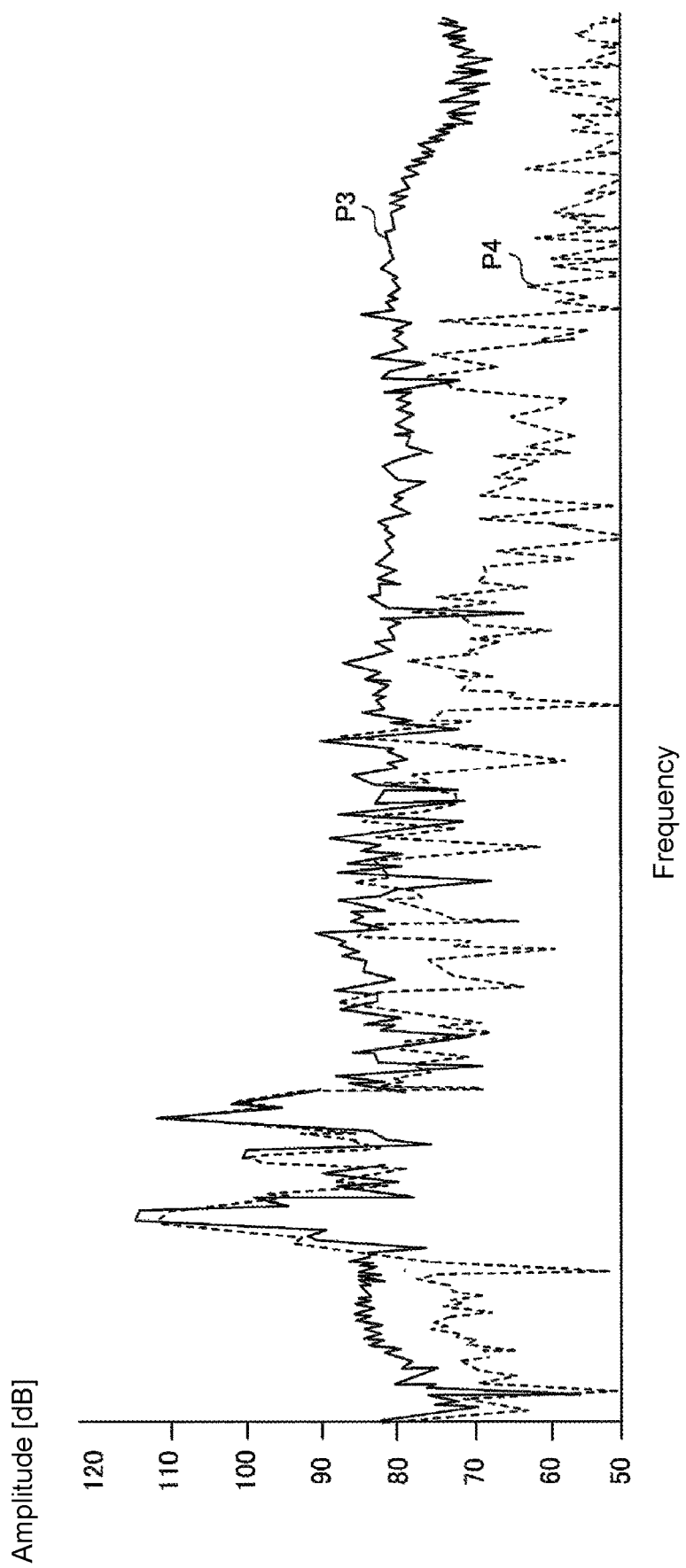
FIG. 18 illustrates an example of a power spectrum generated by an FFT processor in a signal processor according to an embodiment of the disclosure.

FIG. 18 illustrates an example of a power spectrum generated by an FFT processor in a signal processor according to an embodiment of the disclosure. In FIG. 18, the horizontal axis indicates frequency and the vertical axis indicates amplitude [dB]. The solid line in FIG. 18 indicates an example of a power spectrum P3 generated by the FFT processor 40 in the case where the FFT preprocessing is performed by the interference remover 20. The broken line in FIG. 18 indicates an example of a power spectrum P4 generated by the FFT processor 40 in the case where the FFT preprocessing is performed by the interference remover 20A according to a modification.

Referring to FIG. 18, since the power spectrum P4 is a power spectrum generated based on the beat signal SD(n) having no discontinuity, a range side lobe thereof is smaller than that of the power spectrum P3.

[Operation Flow]

A radar device according to an embodiment of the disclosure includes a computer including a memory. An arithmetic processor such as a CPU in the computer may read from the memory a program including some or all of steps of the following flowchart and sequence and execute the same. The program can be installed from the outside. The program is distributed while stored in a recording medium.

Figure 19:
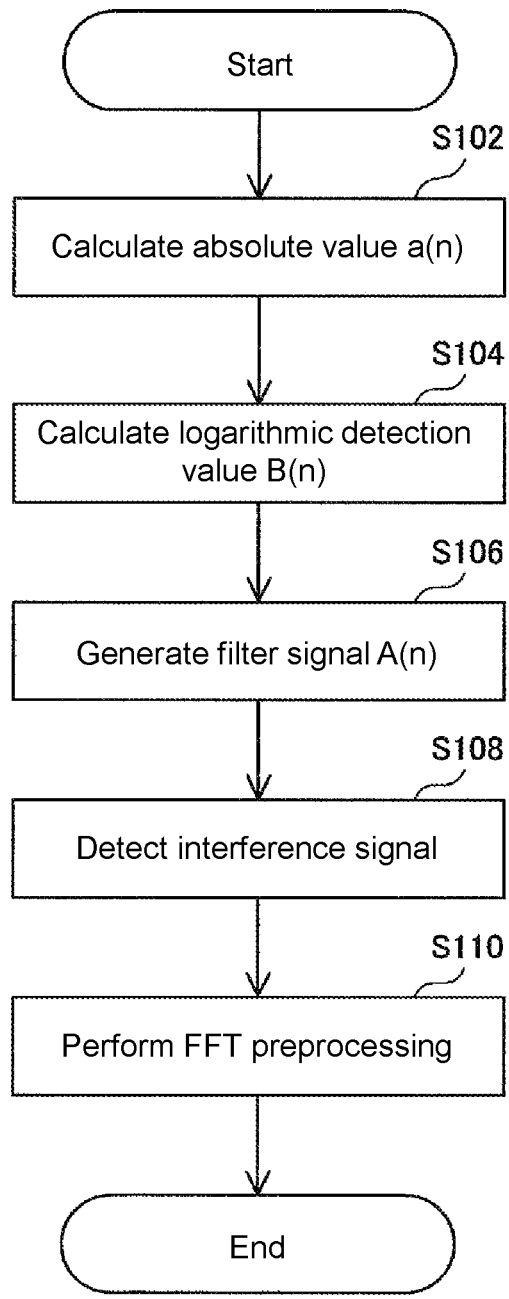
FIG. 19 is a flowchart defining an example of an operation procedure when a radar device according to an embodiment of the disclosure performs FFT preprocessing.

FIG. 19 is a flowchart defining an example of an operation procedure when a radar device according to an embodiment of the disclosure performs FFT preprocessing.

Referring to FIG. 19, firstly, the radar device 300 may calculate the absolute value a(n) of the beat signal SD(n) (step S102).

Next, the radar device 300 may calculate the logarithmic detection value B(n) by performing logarithmic detection of the absolute value a(n) (step S104).

Next, the radar device 300 may generate the filter signal A(n) by filtering the logarithmic detection value B(n) using the smoothing filter in the time domain (step S106).

Next, the radar device 300 may detect the interference signal included in the beat signal SD(n) based on the logarithmic detection value B(n) and the filter signal A(n) (step S108).

Next, the radar device 300 may perform the FFT preprocessing configured to attenuate the amplitude of the interference signal (step S110).

The signal processor 100 according to an embodiment of the disclosure is configured to include the correction part 26. However, the disclosure is not limited thereto. The signal processor 100 may be configured not to include the correction part 26. In this case, for example, the signal processor 100 may include a notifier configured to notify the outside of the signal processor 100 of a detection result of the interference signal by the detector 25.

In the signal processor 100 according to an embodiment of the disclosure, the filter part 24 is configured to determine the average value AvB of multiple logarithmic detection values B(n) as the initial value of the filter signal A(n). However, the disclosure is not limited thereto. The filter part 24 may be configured to determine a preset value as the initial value of the filter signal A(n).

By the way, there is a desire for a technique capable of relatively accurately detecting a target based on a beat signal.

In the signal processor 100 according to an embodiment of the disclosure, the filter part 24 generates the filter signal A(n) by filtering the logarithmic detection value B(n) based on the beat signal SD(n) of the transmitted signal and the received signal using the smoothing filter in the time domain. The detector 25 detects the interference signal included in the beat signal SD(n) based on the logarithmic detection value B(n) and the filter signal A(n).

In this way, by the configuration to detect the interference signal based on the filter signal A(n) generated by filtering the logarithmic detection value B(n) using the smoothing filter in the time domain and the logarithmic detection value B(n), the interference signal including interference waves of various frequencies can be detected by simple processing. In addition, since the beat signal SD(n) has relatively large signal level fluctuation in the azimuth direction, in the case of applying the interference removal processing in the azimuth direction generally used in a conventional pulse radar to the beat signal SD(n), erroneous determination of the interference signal may occur. In contrast, by the above configuration, erroneous determination due to signal level fluctuation of the beat signal in the azimuth direction can be suppressed and the interference signal can be relatively accurately detected. Thus, a decrease in the SN ratio of the power spectrum P generated based on the beat signal SD(n) can be suppressed. Therefore, the target can be relatively accurately detected based on the beat signal SD(n).

In the signal processor 100 according to an embodiment of the disclosure, the filter part 24 changes the setting of the smoothing filter based on the comparison result between the filter signal A(n−1) and the logarithmic detection value B(n).

By such a configuration, the filter signal A(n) can be generated that enables relatively reliable detection of the interference signal according to the comparison result between the filter signal A(n−1) and the logarithmic detection value B(n).

In the signal processor 100 according to an embodiment of the disclosure, in the case where a change in the logarithmic detection value B(n) input to the smoothing filter satisfies a particular condition, the filter part 24 changes the smoothing filter to the setting to further suppress a temporal change in the filter signal A(n).

By such a configuration, a failure to detect the interference signal due to the filter signal A(n) following a change in the logarithmic detection value B(n) can be suppressed, and the filter signal A(n) that enables relatively reliable detection of the interference signal can be generated.

In the signal processor 100 according to an embodiment of the disclosure, the detector 25 detects the interference signal based on the comparison result between the logarithmic detection value B(n) and the filter signal A(n).

By such a configuration, the interference signal can be detected by simple processing using the generated filter signal A(n) and logarithmic detection value B(n).

In the signal processor 100 according to an embodiment of the disclosure, the detector 25 detects the interference signal based on the difference or ratio between the logarithmic detection value B(n) and the filter signal A(n).

By such a configuration, the interference signal can be relatively accurately detected by simple processing using a preset threshold regarding the difference or ratio between the filter signal A(n) and the logarithmic detection value B(n).

In the signal processor 100 according to an embodiment of the disclosure, the correction part 26 performs the signal processing configured to attenuate the amplitude of the interference signal.

By such a configuration, a component of the interference wave included in the beat signal SD(n) can be attenuated. Thus, the target can be relatively accurately detected using the beat signal SD(n) after correction processing.

In the signal processor 100 according to an embodiment of the disclosure, by multiplying the beat signal SD(n) by the window function Wf, the correction part 26A performs the signal processing configured to attenuate the amplitude of the beat signal SD(n) in the domain including the interference signal.

By such a configuration, a shape increase or decrease in the amplitude of the beat signal SD(n) after correction processing can be suppressed. Thus, an increase in range side lobe in the power spectrum P generated by subjecting the beat signal SD(n) to FFT processing can be suppressed.

In the signal processor 100 according to an embodiment of the disclosure, the filter part 24 determines the average value AvB of the logarithmic detection value B(n) at a given time as the initial value of the filter signal A(n).

By such a configuration, the filter signal A(n) can be generated using the determined initial value and a recursive function.

In the signal processor 100 according to an embodiment of the disclosure, the smoothing filter used in the filter part 24 is an IIR filter.

By such a configuration, compared to a configuration in which the filter signal A(n) is generated using a finite impulse response (FIR) filter, the filter signal A(n) that does not follow a sharp increase or decrease in the logarithmic detection value B(n) can be generated. Thus, false detection of the interference signal can be suppressed.

The radar device 300 according to an embodiment of the disclosure includes the signal processor 100, the transmitter 120, and the receiver 150. The transmitter 120 transmits the transmitted signal. The receiver 150 receives the reflected signal obtained by reflecting the transmitted signal by the target.

By such a configuration, the radar device 300 that relatively accurately detects the target based on the beat signal SD(n) and the logarithmic detection value B(n) can be realized.

In the radar device 300 according to an embodiment of the disclosure, the transmitter 120 transmits the transmitted signal via the rotating transmitting antenna 130. The receiver 150 receives the reflected signal via the rotating receiving antenna 140.

By such a configuration, the transmitted signal can be transmitted and the reflected signal can be received in various directions. Thus, the target can be detected in a relatively wide range.

A radar signal processing method according to an embodiment of the disclosure is a radar signal processing method in the signal processor 100 used in the radar device 300. In the radar signal processing method, firstly, the filter signal A(n) may be generated by filtering the logarithmic detection value B(n) based on the beat signal SD(n) of the transmitted signal and the received signal using the smoothing filter in the time domain. Next, the signal processor 100 may detect the interference signal included in the beat signal SD(n) based on the logarithmic detection value B(n) and the filter signal A(n).

In this way, by the method for detecting the interference signal based on the filter signal A(n) generated by filtering the logarithmic detection value B(n) using the smoothing filter in the time domain and the logarithmic detection value B(n), the interference signal including interference waves of various frequencies can be detected by simple processing. In addition, since the beat signal has relatively large signal level fluctuation in the azimuth direction, in the case of applying interference removal processing in the azimuth direction generally used in a conventional pulse radar to the beat signal, erroneous determination of the interference signal may occur. In contrast, by the above method, erroneous determination due to signal level fluctuation of the beat signal SD(n) in the azimuth direction can be suppressed and the interference signal can be relatively accurately detected. Thus, a decrease in the SN ratio of the power spectrum P generated based on the beat signal SD(n) can be suppressed. Therefore, the target can be relatively accurately detected based on the beat signal SD(n).

The above embodiments are examples in all aspects and should not be interpreted as limitations. The scope of the disclosure is defined by claims instead of the above descriptions, and it is intended to include all modifications within the scope of the claims and the equivalents thereof.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, movable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A radar signal processing device comprising:
a processing circuitry configured to:
generate a processing signal based on a beat signal obtained from a transmitted signal and a received signal;
generate a smoothed signal by filtering the processing signal using a smoothing filter in a time domain;
detect an interference signal included in the beat signal based on the processing signal and the smoothed signal; and
change a setting of the smoothing filter based on a comparison between the smoothed signal and the processing signal.

2. The radar signal processing device according to claim 1, wherein the processing circuitry is further configured to:
change the setting of the smoothing filter to further suppress a temporal change in the smoothed signal when a change in the processing signal satisfies a particular condition.

3. The radar signal processing device according to claim 2, wherein the processing circuitry is further configured to:
detect the interference signal based on a comparison between the processing signal and the smoothed signal.

4. The radar signal processing device according to claim 3, wherein the processing circuitry is further configured to:
detect the interference signal based on a difference or ratio between the processing signal and the smoothed signal.

5. The radar signal processing device according to claim 4, wherein the processing circuitry is further configured to:
attenuate an amplitude of the interference signal.

6. The radar signal processing device according to claim 5, wherein the processing circuitry is further configured to:
attenuate an amplitude of the beat signal at a time including the interference signal by applying a window function on the beat signal.

7. The radar signal processing device according to claim 6, wherein the processing circuitry is further configured to:
determine an average value of the processing signal at a given time as an initial value of the smoothed signal.

8. The radar signal processing device according to claim 7, wherein the smoothing filter is an IIR filter.

9. A radar device comprising:
the radar signal processing device according to claim 8;
a transmitter configured to transmit the transmitted signal; and
a receiver configured to receive a reflected signal reflected by a target.

10. The radar device according to claim 9, wherein
the transmitter is configured to transmit the transmitted signal via a rotating antenna, and
the receiver is configured to receive the reflected signal via a rotating antenna.

11. The radar signal processing device according to claim 1, wherein the processing circuitry is further configured to:
detect the interference signal based on a comparison between the processing signal and the smoothed signal.

12. The radar signal processing device according to claim 1, wherein the processing circuitry is further configured to:
attenuate an amplitude of the interference signal.

13. The radar signal processing device according to claim 1, wherein the processing circuitry is further configured to:
determine an average value of the processing signal at a given time as an initial value of the smoothed signal.

14. The radar signal processing device according to claim 1, wherein the smoothing filter is an IIR filter.

15. A radar device comprising:
the radar signal processing device according to claim 1;
a transmitter configured to transmit the transmitted signal; and
a receiver configured to receiving the reflected signal, the reflected signal being obtained by reflecting the transmitted signal by the target.

16. A radar signal processing method comprising:
generating a processing signal based on a beat signal obtained from a transmitted signal and a received signal;
generating a smoothed signal by filtering the processing signal using a smoothing filter in a time domain;
detecting an interference signal included in the beat signal based on the processing signal and the smoothed signal; and
changing a setting of the smoothing filter based on a comparison between the smoothed signal and the processing signal by a processing circuitry.

17. A non-transitory computer-readable medium storing a radar signal processing program, by a processing circuitry, the radar signal processing program being configured to execute:
processing configured to generate a processing signal based on a beat signal obtained from a transmitted signal and a received signal;
processing configured to generate a smoothed signal by filtering the processing signal using a smoothing filter in a time domain;
processing configured to detect an interference signal included in the beat signal based on the processing signal and the smoothed signal; and
changing a setting of the smoothing filter based on a comparison between the smoothed signal and the processing signal.

* * * * *